United States Patent [19]
Ozin et al.

[11] Patent Number: 5,320,822
[45] Date of Patent: Jun. 14, 1994

[54] PROCESS OF GROWING CRYSTALLINE MICROPOROUS SOLIDS IN A FLUORIDE-CONTAINING, SUBSTANTIALLY NON-AQUEOUS GROWTH MEDIUM

[75] Inventors: Geoffrey A. Ozin; Alex Kuperman; Susan Nadimi, all of Toronto, Canada

[73] Assignee: The Dow Chemical Company, Midland, Mich.

[21] Appl. No.: 11,059

[22] Filed: Jan. 29, 1993

Related U.S. Application Data

[63] Continuation-in-part of Ser. No. 795,354, Nov. 20, 1991, abandoned.

[51] Int. Cl.$^5$ ............... C01B 33/34; C01B 33/20; C01B 33/26; B01J 29/06
[52] U.S. Cl. .................. 423/700; 423/328.2; 423/701; 423/702; 423/704; 423/705; 423/706; 423/708; 502/64
[58] Field of Search ............... 423/700, 701, 702, 705, 423/706, 768; 502/66

[56] References Cited

U.S. PATENT DOCUMENTS

| | | | |
|---|---|---|---|
| 4,073,865 | 2/1978 | Flanigen et al. | 423/705 |
| 4,296,083 | 10/1981 | Rollmann | 423/708 |
| 4,375,458 | 3/1983 | Dwyer et al. | 423/705 |
| 4,578,259 | 3/1986 | Morimoto et al. | 423/703 |
| 4,622,214 | 11/1986 | Comyns et al. | 423/706 |
| 4,639,357 | 1/1987 | Derouane et al. | 423/701 |
| 4,647,442 | 3/1987 | Derouane et al. | 423/701 |
| 4,650,656 | 3/1987 | Dwyer et al. | 423/705 |
| 4,664,897 | 5/1987 | Derouane et al. | 423/702 |
| 4,673,559 | 6/1987 | Derouane et al. | 423/701 |
| 4,705,675 | 11/1987 | Desmond et al. | 423/706 |
| 4,713,227 | 12/1987 | Derouane et al. | 423/701 |
| 4,795,623 | 1/1989 | Evans | 423/706 |
| 4,923,835 | 5/1990 | Travers et al. | 502/66 |
| 4,942,027 | 7/1990 | Evans | 423/706 |
| 4,982,046 | 1/1991 | Guth et al. | 583/533 |

FOREIGN PATENT DOCUMENTS

| | | |
|---|---|---|
| 88100228 | 8/1988 | China . |
| 0337479 | 10/1989 | European Pat. Off. . |
| 2631621 | 5/1988 | France . |
| 2632943 | 12/1989 | France . |

OTHER PUBLICATIONS

Derwent 88-021952/04 (1986) May.
Derwent 87-300582/43 (1986) Apr.
Wenyang et al., *Zeolites*, 1990 vol. 10, Nov./Dec., pp. 753-759.
Wenyang Xu et al. *J. Chem. Soc. Chem. Commun.*, 1990, pp. 131-132.
Wenyang Xu et al., *J. Chem. Soc., Chem. Commun.*, 1990, pp. 755-756.
Xu Wenyang et al., *Zeolites*, 1989, vol. 9, Nov., pp. 468-473.
Huo Qisbeng et al., *J. Chem. Soc., Chem. Commun.*, 1988, pp. 1486-1487.

(List continued on next page.)

Primary Examiner—Mark L. Bell
Assistant Examiner—David R. Sample
Attorney, Agent, or Firm—Marie F. Zuckerman

[57] ABSTRACT

Crystalline microporous solids, such as aluminosilicate zeolites or silica molecular sieves, are grown in a fluoride-containing, substantially non-aqueous medium to form crystals on the order 0.3-3 mm in size. This growth process involves preparing a mixture containing one or more nutrients capable of forming the crystalline microporous solid, such as a source of silica and a source of alumina; water in a controlled amount; a growth medium comprising hydrogen fluoride and a nitrogen-containing organic base, such as pyridine; and optionally an organic solvent and/or a structure-directing agent; and thereafter heating the resulting mixture for a time sufficient to produce the crystalline microporous solid.

22 Claims, No Drawings

OTHER PUBLICATIONS

W. A. van Erp et al., *Zeolites*, 1987, vol. 7, Jul., pp. 286–288.

J. Patarin et al., *Zeolites*, 1989, vol. 9, Sep., pp. 297–404.

L. Delmotte et al., *Zeolites*, 1990, vol. 10, Nov./Dec., pp. 778–783.

Geoffrey A. Ozin et al., *Angew. Chem. Int. Ed. Engl.*, 28 (1989) No. 3 pp. 359–376.

Gosse Boxhoorn et al., *J. Chem. Soc., Chem. Commun.*, 1983, pp. 1416–1418.

D. M. Bibby et al., *Nature*, vol. 317 (Sep. 12, 1985), pp. 157–158.

E. Pernklau, *N. Jb. Miner. Mh.*, Jg. 1898, H. 9, pp. 385–389 Sep.

Huo Qisheng et al., *Zeolites: Facts, Figures, Future*, 1989, Elsevier Sci. Publ. B.V., Amsterdam, pp. 291–298.

Huo Qisbeng et al., *J. Chem. Soc. Chem. Commun.*, 1990, pp. 783–784.

George A. Olah et al., *Synthesis*, Communications, Dec. 1973, pp. 779–780.

Ghilun Qiu et al., *Zeolites*, 1989, vol. 9, Sep., pp. 440–444.

J. L. Guth et al. *Studies and Surface Science Catalysis*, vol. 28, (1986) pp. 121–128.

Zhao Daqing et al., *J. Chem. Soc. Chem. Commun.*, 1990, #12, pp. 884–885.

W. J. Smith et al., *J. Chem. Soc. Faraday Trans.* 1, 1989, 85(11), pp. 3623–3628.

PROCESS OF GROWING CRYSTALLINE MICROPOROUS SOLIDS IN A FLUORIDE-CONTAINING, SUBSTANTIALLY NON-AQUEOUS GROWTH MEDIUM

CROSS REFERENCE TO RELATED APPLICATION

This application is a continuation-in-part application of application Ser. No. 795,354, filed Nov. 20, 1991 now abandoned.

BACKGROUND OF THE INVENTION

This invention relates to the synthesis of crystalline microporous solids in a growth medium. Crystalline microporous solids include, for example, silica molecular sieves and aluminosilicate zeolites.

Crystalline microporous solids are well-known for their utility as heterogeneous catalysts in industrial organic processes, such as, the alkylation of aromatic compounds with olefins; the transalkylation of aromatic compounds; the isomerization of aromatic compounds, paraffins, and olefins; the disproportionation of aromatic compounds; the cracking and hydrocracking of hydrocarbons; and the oligomerization of olefins. Moreover, zeolites and molecular sieves are useful as adsorbents for purifying gases, useful for separating mixtures of chemicals and isomers, useful as supports for catalytic metals and metal compounds, and useful for ion exchange.

Crystalline microporous solids are commonly prepared by hydrothermal methods. A typical preparation involves heating one or more nutrients, such as a source of silica and optionally a source of alumina, in water in the presence of a mineralizer and a structure directing agent until crystallization occurs. The mineralizer, which is usually hydroxide, functions as a solubilizer of silica and alumina transporting them through the reactive solution or gel to nucleation sites. The structure directing agent includes templates and stabilizers. The template, which may be a cation or neutral species, tends to favor the nucleation and growth of a particular zeolite. The stabilizer, often referred to as a pore filler, functions in a stabilizing role and may be required for a successful synthesis. Water and organic bases, such as primary, secondary and tertiary aliphatic amines and tetraalkylammonium halides, are common stabilizers. Additionally, the template and stabilizer may assist in controlling pH and/or may provide charge balance with a counteranion or anionic framework. Several typical hydrothermal methods of preparing crystalline microporous solids are described hereinbelow.

U.S. Pat. Nos. 4,942,027 and 4,795,623 disclose a hydrothermal synthesis of sodium ferrierite. The synthesis involves adding sources of sodium, aluminum and silicon to an excess of water in the presence of a nitrogen-containing compound, such as pyridine, to form a mixture which is thereafter heated for a period of time under autogenous pressure to effect crystallization.

U.S. Pat. No. 4,578,259 teaches the synthesis of a siliceous crystalline aluminosilicate designated "ISI-6." The synthesis comprises forming an aqueous mixture containing sources of silica and alumina, a source of alkali metal, pyridine, an oxygen-containing organic component, such as an alcohol, and a nitrogen-containing component other than pyridine, such as isopropylamine, and subjecting the mixture to a temperature ranging from 100° C. to 300° C. until the crystalline aluminosilicate is formed.

W. J. Smith et al. teach in the *Journal of the Chemical Society, Faraday Transactions I*, 85, (1989) 3623, that zeolites ferrierite, mordenite, and ZSM-5 are crystallized from an aqueous growth medium comprising silica, alumina, sodium oxide, and pyridine. The ferrierite is limited to silica to alumina molar ratios greater than 28.6. Crystal sizes range from 5 microns ($\mu$m) to 20 $\mu$m.

Among the known hydrothermal methods are some which employ fluoride as a mineralizer. European patent application No. 337,479A, for example, discloses the use of hydrogen fluoride or fluorine-containing compounds in water at low pH to mineralize the silica in glass for a synthesis of zeolite ZSM-5.

Z. Daqing et al. disclose in the *Journal of the Chemical Society, Chem. Communications*, 1990, 884, the preparation of an aluminosilicate zeolite designated "CJS-1" from an aqueous medium containing hydrogen fluoride and piperazine. The molar composition of the reaction mixture comprises 0.5 piperazine, 0.04 alumina ($Al_2O_3$), 1.0 silica ($SiO_2$), 1.0 hydrogen fluoride, and 30 water. Thus, the water to silica molar ratio, $H_2O/SiO_2$, is 30/1 and the water to piperazine molar ratio is 60/1.

French Patents 2,632,943 and 2,631,621 disclose the synthesis of zeolites having structures designated MTT and TON under hydrothermal conditions in the presence of fluoride as a mineralizer. The synthesis mixture contains water, a source of silica, possibly a source of an aluminum salt, a source of a mobilizing agent containing fluoride ion, such as hydrogen fluoride, and a source of a structuring agent capable of supplying organic cations, such as isopropylamine. It is taught that the water to silica molar ratio ranges from 6 to 200, preferably from 15 to 80, and the organic structuring agent to silica molar ratio ranges from 0.1 to 6, preferably from 1 to 5. Thus, the water to organic structuring agent molar ratio may range from 1 to 2000, preferably from 3 to 80. It is further disclosed that fluoride may replace oxide in the framework of the crystalline zeolite formed. The crystal size of these zeolites is taught to range from 0.1 $\mu$m to 250 $\mu$m, preferably from 2 $\mu$m to 130 $\mu$m.

There are disadvantages to synthesizing microporous solids by hydrothermal methods. Typically, the crystalline products of such systems are formed under highly metastable conditions defined by a large number of variables. As a result, the crystallization of mixed phases is not uncommon and the purity of the crystalline solid can be compromised. In addition, in aqueous media employing hydroxide as the mineralizer the pH is limited to the basic range, thus restricting the silica and alumina precursor species which form the crystalline products.

As an even more significant disadvantage, nucleation and growth of crystalline microporous solids in aqueous media are uncontrolled resulting in random and unconstrained formation of small crystals and microcrystalline aggregates. Thus, hydrothermal methods usually yield crystals ranging in size from about 0.1 $\mu$m to about 60 $\mu$m and rarely exceeding 100 $\mu$m. In applications in the fields of catalysis, adsorption, separations, and catalytic supports, it is beneficial for the microporous solid to have a high surface area and a microcrystalline nature. Disadvantageously, however, certain high technology solid-state applications cannot be achieved with small crystals in the micron-size range.

High technology, solid-state applications for microporous solids can be found in the fields of membrane technologies, molecular electronics, non-linear optical materials, chemical sensors and advanced batteries, as disclosed by G. A. Ozin, A. Kuperman and A. Stein in the review article "Advanced Zeolite Materials Science," *Angewante Chemie International Edition English,* 28 (1989), 359–376. Such applications will rely on introducing insulator, semiconductor or metallic guest materials either into the framework or into the extra framework sites of a microporous solid which acts as a host. Alternatively, thin films of such guest-host composites may be required. It is generally believed that large single crystals on the order of at least 100 µm, that is 0.1 millimeter (mm), and preferably at least 0.3 mm, are needed if the electronic, optical, magnetic, and chemical properties of crystalline microporous host solids and their guest—host composites are to be successfully exploited for these advanced technologies.

In recent years the synthesis of crystalline microporous solids has been investigated in aqueous-organic solvent mixtures as well as in non-aqueous media. The number of precursor species may be reduced in a non-aqueous system, thereby producing purer crystalline phases. See, for example, G. Boxhoorn et al. in the *Journal of the Chemical Society, Chemical Communications,* 1983, 1416, who studied the influence of organic additives on the precursor species in an aqueous ZSM-5 synthesis. In addition, silica and alumina are expected to exhibit different solubilities in non-aqueous solvents, while the precursor species are expected to exhibit different diffusion rates. Changes in the solubilities and diffusion rates are expected to affect nucleation and crystallization processes, but not in a predictable manner.

D. M. Bibby et al. disclose in *Nature,* 317, (1985) 157, that sodalite can be prepared either in a silica-rich aluminosilicate form or in a pure-silica form from an "essentially non-aqueous solvent system," exemplified by ethylene glycol or propanol. Sodium hydroxide is the disclosed mineralizer. The crystal size is taught to be no greater than about 30 µm.

E. Pernklau discloses in *N. Jb. Miner. Mh.,* 9, (1989) 385, that sodalite is obtained from a variety of organic solvents, including s-butyl alcohol, glycerol, hexamethyleneimine, sulfolane, triethylenediamine, and various glycols. Sodium hydroxide is employed as a mineralizer, and the solvents are taught to be "anhydrous of analytical grade."

H. Qisheng et al. disclose in *Zeolites: Facts, Figures, Future,* Elsevier Science Publishers B.V., Amsterdam, 1989, pp. 291f, that pentasil zeolites, namely silicalite, ZSM-39 and ZSM-48, can be grown in organic solvents in the presence of templating agents or crystal seeds. Specific solvents include glycol, glycerol, sulfolane, dimethylsulfoxide, ethanol, pyridine, and $C_{6-7}$ alcohols. The crystalline product and its ring size (4, 5, 6) depend upon the amount of alkali and specific templating agent employed. Crystals in the size range from about 20 µm to about 30 µm are taught.

Disadvantageously, the above-described processes employing aqueous-organic solvent mixtures or non-aqueous growth media do not necessarily lead to fewer, purer crystal phases. Moreover, heretofore the crystals obtained from aqueous-organic solvent mixtures and non-aqueous growth media are not larger in size than the crystals obtained from hydrothermal methods. Thus, prior art methods do not yield crystals which are useful for solid-state, high technology applications. Accordingly, a need exists to find a general method of growing crystalline microporous solids which leads to purer phases and crystals of at least about 0.1 mm, and preferably at least about 0.3 mm, in size.

SUMMARY OF THE INVENTION

In its broadest aspect, this invention is a process of growing a crystalline microporous solid comprising preparing a mixture containing:
 (a) one or more nutrients capable of forming the crystalline microporous solid wherein the one or more nutrients are selected from the group consisting of a source of silica, a source of alumina, and a source of a charge balancing ion;
 (b) a growth medium comprising a nitrogen-containing organic base, hydrogen fluoride, and optionally, an organic solvent which does not inhibit the mineralization of the nutrients; the nutrients and growth medium being present in proportions sufficient to provide for the formation of the crystalline microporous solid; and
 (c) water in an amount such that the molar ratio of water to total framework-forming elements excluding oxygen is no greater than about 6, and such that the ratio of the moles of water to combined moles of nitrogen-containing organic base and optional organic solvent is no greater than about 0.6,
and heating the resulting mixture for a time sufficient to produce a crystalline microporous solid.

For the purposes of this invention, a "crystalline microporous solid" is defined as a solid which possesses a defined and ordered crystalline framework structure within which there is a regular array of cavities, channels or pores. The crystalline framework of such solids can be determined by well-known analytical techniques, such as X-ray diffraction (XRD) and neutron diffraction. In this invention the "framework-forming elements" include silicon and aluminum, but not oxygen. Typically, silicon and aluminum are called the "T" atoms and possess four-fold coordination of tetrahedral or distorted tetrahedral symmetry. Under some circumstances a higher coordination number is possible. Accordingly for the purposes of this invention, the above—identified framework-forming elements may occupy a site wherein the coordination number ranges from four to eight. The aforementioned cavities or channels or pores are distributed throughout the microporous solid in a regular fashion and can be one, two or three dimensional. The two and three dimensional channels may be isolated or interconnected. Typically, the size of the pores can range from about 4 Å to about 20 Å in cross-sectional dimension, as determined by porosity measurements known to those skilled in the art.

The above-identified process of this invention provides a general method of preparing a microporous crystalline solid in a substantially non-aqueous growth medium. Microporous crystalline solids of small crystal size grown by the process described herein are useful as catalysts, adsorbents and supports. Surprisingly, the process of this invention exhibits a significant advantage over the processes of the prior art in that the process of this invention can also yield crystalline microporous solids having a crystal size of at least about 0.3 mm. Even more advantageously, crystals of up to about 3 mm in size can be prepared. By comparison, these crystals are about one to three orders of magnitude larger than crystals of similar composition grown by conventional hydrothermal and non-aqueous methods of the prior art. In fact, the microporous crystalline solids grown by the process described herein possess the largest synthetic crystal sizes known at this time.

In a second aspect, this invention is a crystalline microporous solid having a crystal size of at least about 0.3 mm, the solid being selected from the group consisting of the MOR, MFI, and MTN families of crystalline microporous solids. The designations MOR, MFI and MTN represent the mordenite (including ferrierite), ZSM-5 (including silicalite), and dodecasil families, respectively.

The large crystals of MOR, MFI, and MTN crystalline microporous solids achieved by the process of this invention are suitable for high-technology solid state electronic and optical applications, such as those mentioned hereinbefore.

DETAILED DESCRIPTION OF THE INVENTION

In a preferred aspect, this invention is a process of growing a crystalline silica microporous solid. The process comprises preparing a mixture containing (a) a source of silica, (b) a growth medium comprising hydrogen fluoride, a nitrogen-containing base selected from the group consisting of pyridine, ring-substituted pyridines, and primary, secondary, and tertiary alkylamines, and optionally, an organic solvent other than the pyridines and alkylamines mentioned herein which does not hinder the mineralization of the source of silica, and (c) water such that the water/silicon molar ratio is no greater than about 6 and such that the ratio of the moles of water to the combined moles of nitrogen-containing base and optional organic solvent is no greater than about 0.6. Thereafter, the resulting mixture is heated for a time sufficient to produce a crystalline silica microporous solid, preferably having a crystal size of at least about 0.3 mm.

In a second preferred aspect, this invention is a process of growing a crystalline aluminosilicate zeolite. The process comprises preparing a mixture containing (a) a source of silica, a source of alumina and a source of a charge balancing cation in amounts sufficient to form an aluminosilicate zeolite, (b) a growth medium comprising hydrogen fluoride, a nitrogen-containing base selected from the group consisting of pyridine, ring-substituted pyridines, and primary, secondary, and tertiary alkylamines, and optionally, an organic solvent other than the pyridines and alkylamines mentioned herein which does not hinder the mineralization of the sources of silica, alumina and charge balancing cation, and (c) water such that the ratio of moles of water to combined moles of silicon and aluminum is no greater than about 6 and such that the ratio of the moles of water to the combined moles of nitrogen-containing base and optional organic solvent is no greater than about 0.6. Thereafter, the resulting mixture is heated for a time sufficient to produce a crystalline aluminosilicate zeolite, preferably having a crystal size of at least about 0.3 mm.

In a related aspect, this invention is a process of preparing a crystalline microporous solid according to any of the above-described methods wherein the mixture also contains one or more structure-directing agents.

The above-identified processes of this invention provide a general method of preparing a microporous crystalline solid in a fluoride-containing, substantially non-aqueous growth medium. As defined hereinbefore, a crystalline microporous solid is a solid which possesses an identifiable and ordered crystalline framework structure within which there is a regular array of cavities, channels or pores.

Any crystalline microporous solid selected from the group consisting of silica molecular sieves and clathrasils and aluminosilicate zeolites can be prepared by the process of this invention. Non-limiting examples of suitable microporous solids include silicas, such as pure silica sodalite; pentasil zeolites, such as silicalite and pure silica ferrierite; and clathrasil zeolites, such as dodecasil 3-C, dodecasil 3-T and dodecasil 1-H. Also suitably prepared by the process of this invention are aluminosilicate zeolites, such as zeolites X, Y, mordenite, ferrierite, L, $\Omega$, beta, and the ZSM zeolites, including ZSM-5, ZSM-11, ZSM-12 and the like. In addition, the process of this invention may result in the formation of new microporous crystalline phases heretofore unknown. Preferred are the silica molecular sieves and aluminosilicate zeolites. More preferred are aluminosilicate zeolites.

The growth medium which characterizes the method of this invention is a non-aqueous medium comprising a nitrogen-containing organic base and hydrogen fluoride. Suitable nitrogen-containing organic bases are capable of solubilizing the structure-directing agent (template or stabilizer) and in the presence of the fluoride mineralizer capable of at least partly solubilizing the inorganic nutrients for the microporous solid. In addition, the nitrogen-containing organic base should be sufficiently basic to generate hydroxide ions on reaction with the controlled amount of water which may be employed in this process. Generally, the nitrogen-containing organic base is a liquid at reaction temperature.

Suitable nitrogen-containing organic bases include pyridine and ring-substituted pyridines wherein the substituent is a $C_{1-10}$ alkyl moiety. Also suitable are alkylamines, preferably $C_{1-10}$ alkylamines, such as ethylamine, diethylamine, triethylamine, propylamine, dipropylamine, tripropylamine, isopropylamine, diisopropylamine, triisopropylamine, butylamines, dibutylamines, tributylamines, cyclohexylamine, and the like, as well as aromatic amines, such as aniline and toluidine. N,N'-dimethylformamide is suitable, as are N-heterocycles other than pyridine, such as morpholine and quinuclidine. Suitable nitrogen-containing organic bases are not limited to those disclosed herein, and it is possible that others may be found which are acceptable for the process of this invention. Preferably, the N-containing organic base is pyridine, a ring-substituted pyridine or a primary, secondary or tertiary alkylamine, more preferably, pyridine or triethylamine.

One of the preferred growth media comprising pyridine and hydrogen fluoride is reported to contain a network of pyridinium polyhydrogen fluoride in equilibrium with a small amount of free hydrogen fluoride. See G. Olah et al., *Synthesis*, 1973, 779, for a description of the physical properties and theoretical structure of this fluoride solution. Based upon 19F nuclear magnetic resonance studies, Olah et al. conclude that each fluoride is hydrogen bonded at any time to four hydrogens. The pyridinium polyhydrogen fluoride network is believed to contain some "free" hydrogen fluoride in equilibrium, thus acting as a reservoir for anhydrous hydrogen fluoride. Such a model, however, should not be considered to be limiting of the process of this invention.

Optionally, the nitrogen-containing organic base may be combined with a second organic solvent. Suitable organic solvents are usually liquids at reaction temperature, and they do not inhibit the mineralization of the nutrients and crystallization of the product. Glycols, such as ethylene glycol, propylene glycol and diethylene glycol, and simple monoalcohols, such as butanol and hexanol, may be employed, as well as non-polar solvents, such as mineral oil, and a variety of silicones. Other organic solvents may be found to be suitable. As a further alternative, the nitrogen-containing organic base may be immiscible with the optional organic solvent. In this type of two-phase liquid system the hydrogen fluoride may be substantially dissolved in one of the phases, while one or more of the nutrients may be substantially dissolved in the other phase.

The amount of nitrogen-containing organic base and optional second organic solvent which is employed in this process can vary widely. Generally, the ratio of combined moles of nitrogen-containing organic base and optional organic solvent to combined moles of framework-forming elements excluding oxygen ranges from about 9 to about 30,000. The proportion which is optional organic solvent can range from 0 to about 93 percent of the combined solvents.

The growth medium of this invention comprising hydrogen fluoride in combination with a nitrogen-containing base and optional organic solvent possesses several properties which are especially advantageous for the formation of crystalline microporous solids. For example, in addition to its role as a solvent, the nitrogen-containing base may act as a template or stabilizer. Accordingly, the addition of a separate template or stabilizer may not be required. (In those instances where a template or stabilizer other than the nitrogen-containing base is essential, that required compound may simply be added to the growth medium.) As a second advantage, the growth medium of this invention provides fluoride which acts beneficially as a mineralizer of inorganic oxides, such as silica and alumina.

Mineralizers, also known as solubilizers, are well-known in the art to increase the solubility of inorganic nutrients in the growth medium as well as to transport nutrients to nucleation sites. Mineralizers may be construed to be "catalysts" in that they are consumed on dissolution of the inorganic nutrients in the growth media and regenerated when the microporous solid is crystallized. Unexpectedly, it has now been discovered as disclosed herein that when hydrogen fluoride is employed as a mineralizer with a nitrogen-containing organic base and optional organic solvent that crystals of a microporous solid are formed which are larger in size than those obtained by known methods.

The concentration of hydrogen fluoride in the nitrogen-containing organic base and optional organic solvent is any concentration which is suitable for growing a microporous crystalline solid. Generally, the maximum concentration of hydrogen fluoride dissolved in the nitrogen-containing base and optional organic solvent will be determined by the solubility of gaseous HF in that base or solvent mixture. The upper limit is typically about 70 weight percent hydrogen fluoride in nitrogen-containing organic bases. For example, up to 70 weight percent hydrogen fluoride can be dissolved in pyridine.

Solutions of hydrogen fluoride can be prepared by dissolving the desired quantity of gaseous HF in the nitrogen-containing base of interest. Preferred solutions comprising 70 weight percent hydrogen fluoride in pyridine or 37 weight percent hydrogen fluoride in triethylamine are stable and easy to handle, and as an added advantage, can be purchased commercially. Hydrogen fluoride is not lost from these solutions to any degree when they are warmed up to about 50° C. If desired, the preferred solutions may be diluted with additional pyridine or triethylamine or a second suitable organic solvent to lower the fluoride concentration. Aqueous solutions of hydrogen fluoride may also be employed as a source of hydrogen fluoride provided that the concentration of water introduced from such a source is taken into account and the limitation on the water concentration required of our process is achieved.

Optionally, fluoride salts may be added to the growth medium of this process, if it is desired to increase the concentration of the fluoride mineralizer without further lowering pH. Fluoride salts may also be used to introduce a cationic structure-directing agent. Suitable fluoride salts include ammonium fluoride and alkylammonium fluorides, such as dipropylammonium fluoride and isopropylammonium fluoride. Metal fluoride salts, such as the alkali and alkaline earth metal fluorides, may be acceptable provided that such salts can be solubilized in the growth medium. A phase transfer reagent, such as a crown ether, may be needed to solubilize the metal fluoride salts. Sodium fluorosilicate and ammonium fluorosilicate are also acceptable sources of additional fluoride.

Typically, the method of this invention comprises adding the nutrients which are capable of forming the microporous crystalline solid to the nitrogen-containing organic base and hydrogen fluoride growth medium and then heating the resulting mixture for a time sufficient to form crystals of the microporous solid. It will be obvious to those skilled in the art that the specific nutrients employed will depend upon the specific microporous crystalline solid desired. For example, crystalline silica molecular sieves will require a source of silica; whereas aluminosilicates will require a source of silica, a source of alumina, and a source of a charge-balancing cation.

It will be obvious to one skilled in the art that the water content of the sources of inorganic nutrients will vary from one specific source to another. Moreover, the absolute amount of water introduced through the nutrient sources will vary depending on the absolute quantities of nutrients employed. Inasmuch as the process of this invention requires specific limitations on the amount of water, attention should be directed to the water concentration of the nutrient sources. For the purposes of this invention, any nutrient source is suitable provided that the limitations on the water concentration, described hereinafter, are achieved.

Any source of silica is acceptable for the process of this invention provided that the source can be mineralized in the growth medium and provided that the limitation on the water concentration is achieved. Suitable non-limiting examples of sources of silica include silica sols, silica gels, fumed silicas, silicic acid, amorphous silicas and silica-aluminas. Preferred are fumed silicas. More preferred are fumed silicas having a surface area in the range from 100 $m^2/g$ to about 380 $m^2/g$. Preferably, the particle size of the source of silica is in the range from about 7 $\mu m$ to about 100 $\mu m$.

The extent of mineralization of the nutrients depends upon the molar ratio of fluoride to total framework-forming elements excluding oxygen. Generally, this ratio ranges from about 0.7 to about 2.0. For example, when silica is the sole nutrient, the fluoride to silicon molar ratio, F-/Si, commonly ranges from about 0.7 to about 2.0, preferably, from about 1.0 to about 1.5. If the ratio is too low, then mineralization may not be sufficient. If, on the other hand, the ratio is too high, then mineralization may be too extensive in the form of fully solubilized fluorosilicate species. Under those circumstances crystallization may be inhibited.

Likewise, any source of alumina is acceptable for the process of this invention provided that the source can be mineralized in the growth medium and provided that the limitation on the water concentration is achieved. Suitable non-limiting examples of sources of alumina include hydrated aluminum oxides, including pseudoboehmite alumina, aluminates, and aluminum salts of inorganic acids, such as sulfuric acid, hydrochloric acid, and nitric acid. Pseudo-boehmite alumina is the preferred source. Preferably, the particle size of the source of alumina is in the range from about 7 $\mu$m to about 7000 $\mu$m, more preferably, in the range from about 7 $\mu$m to about 100 $\mu$m.

The extent of mineralization of alumina by fluoride depends upon the fluoride to alumina molar ratio $F^-/Al_2O_3$. If, for example, the ratio is too low, then mineralization may not be sufficient. If, on the other hand, the ratio is too high, then mineralization may be too extensive in the form of fully solubilized fluoroaluminate species. Under those circumstances little or no crystallization may occur. Typically, the $F^-/Al_2O_3$ molar ratio ranges from about 1.5 to about 4, preferably, from about 2 to about 3.

In those cases where a source of silica and a source of alumina are employed, the molar ratio of silica to alumina derived from these sources may vary widely from values as low as 1/1 to values as high as 40,000/1. In the latter case an essentially siliceous material is obtained.

Any source of charge-balancing ions is acceptable for the process of this invention provided that the source can be solubilized in the growth medium and provided that the limitation on the water concentration is achieved. Suitable charge-balancing cations include the alkali (Group IA), alkaline earth (Group IIA), and transition metal cations of the Periodic Table. Suitable sources of these cations include the carbonate, halide, sulfate, nitrate, acetate, silicate, aluminate, phosphate, oxalate, and carboxylate salts. Other acceptable charge-balancing cations include alkylammonium cations, preferably, wherein the alkyl group or groups contain from 1 to about 20 carbon atoms. Illustrative of these cations are isopropylammonium, dipropylammonium, tetramethylammonium, tetraethylammonium, tetrapropylammonium, tetrabutylammonium, and the like, available as the halides. The process of this invention is not limited to the aforementioned charge-balancing cations, and others may be found which are equally suitable. In certain instances, it may be desirable to add a phase transfer reagent, such as 18-Crown-6 or 15-Crown-5, to mineralize the charge-balancing cation. The amount of charge balancing ion employed in the growth medium will vary depending upon the proportions of framework-forming elements excluding oxygen. Sufficient charge balancing ion should be added to provide overall charge neutrality in the microporous crystalline solid.

In addition to the above-identified nutrients which are capable of forming the crystalline microporous solid, one or more structure-directing agents may be added as optional components to the system. As noted hereinbefore, the structure-directing agent is often categorized as a template or stabilizer and may be multifunctional, for example, enhancing nucleation and crystal growth through stereospecific control, providing charge balance or pH control, and acting as a void filler. In the preferred growth medium comprising pyridine and hydrogen fluoride, pyridine may act as a template or stabilizer. If pyridine or pyridinium cannot provide these functions, and in cases where pyridine is not present, then another suitable structure-directing agent may be added. Besides pyridine, other organic nitrogen-containing compounds make suitable structure-directing agents, such as primary, secondary and tertiary aliphatic and aromatic amines and quaternary ammonium compounds. Non-limiting examples include alkylamines, dialkylamines, trialkylamines, and tetraalkylammonium salts, wherein the alkyl group or groups contain from 1 to about 20 carbon atoms. Non-limiting species include trimethylamine, triethylamine, tripropylamine, ethylenediamine, propylenediamine, 1,4-diaminobutane, 1,5-diaminopentane, 1,6-diaminohexane, methylamine, ethylamine, propylamine, isopropylamine, butylamine, pentylamine, cyclohexylamine, dimethylamine, diethylamine, dipropylamine, and the like, as well as piperidine, morpholine, quinuclidine, and pyrrolidine. Also suitable are aniline and 1-aminoadamantane. Non-limiting examples of quaternary ammonium salts include the fluorides, chlorides and bromides of tetramethylammonium, tetraethylammonium, tetrapropylammonium, tetrabutylammonium, diethylammonium, triethylammonium, dibenzylammonium, dibenzyldimethylammonium, dibenzyldiethylammonium, and benzyltrimethylammonium. Crown ethers, such as 18-Crown-6 and 15-Crown-5, may also be employed as structure-directing agents. The preferred structure-directing agents are the $C_{1-10}$ tetraalkylammonium halides and $C_{1-10}$ alkylamines. Any amount of structure-directing agent is suitable provided that a crystalline microporous solid is obtained as a product. For example, the molar ratio of structure-directing agent to total framework-forming elements excluding oxygen is usually in the range from about 0 to about 3, preferably, in the range from about 0 to about 2, more preferably, in the range from about 0.5 to about 2.

While the intention of this invention is to grow crystalline microporous solids in a non-aqueous environment, the addition of a controlled quantity of water to the crystal growth mixture is desirable. The term "controlled quantity" means that the amount of water present in the growth medium does not exceed a reagent amount and may be low enough to be considered a catalytic amount. For the purposes of this invention, the concentration of water is set forth in the following two limitations. First, the molar ratio of water to framework-forming elements excluding oxygen is required to be no greater than about 6. As a minimum limit, it is possible to practice this invention in the absence of water in which case the molar ratio of water to framework-forming elements is essentially 0. For the purposes of this invention the framework-forming elements are silicon and aluminum, but not oxygen. As noted hereinbefore, silicon and aluminum are known as the "T" atoms because they possess four-fold coordination of tetrahedral or distorted tetrahedral symmetry. Less commonly, the aluminum atom may be found at a framework site having a coordination number higher than four, such as five or six. Thus, for the purposes of this invention the above-identified framework-forming elements may possess a coordination number ranging from four through eight. Preferably, the molar ratio of water to total framework-forming elements ranges from about 2 to about 5, more preferably, from about 3 to about 4. A reagent amount of water may be considered to be present when this molar ratio is in the range from about 3 to about 6. At ratios lower than about 3, water may be considered to be present in a catalytic amount. At ratios higher than about 6, an excess of water is present which converts the process conditions into those of the known hydrothermal method.

The second indicator controlling the quantity of water in the process of this invention is the ratio of moles of water to combined moles of nitrogen-containing organic base and optional organic solvent. Typically, this molar ratio is no greater than about 0.60, preferably no greater than about 0.56, more preferably between about 0.10 and 0.56. In the absence of water the ratio falls to essentially zero.

The above-identified nutrients and water can be added to the growth medium in any order provided that a crystalline microporous solid is achieved in the process. In the preferred order hydrogen fluoride is added to the organic base and water prior to the addition of the source of silica and, if used, the source of alumina. In all cases, the structure-directing agent is preferably added last.

Generally, nucleation is easily achieved in the process of this invention, therefore it is not necessary to use a seed crystal to initiate crystallization. If a seed crystal is desired to aid in more difficult crystallizations, however, it may be added to the reactive mixture or gel prior to closing the reactor and heating its contents.

After the nutrients and any optional components, including template, stabilizer, additional solvent, water, or seed crystal, are added to the reactor, the reactor is sealed and heated at a temperature and pressure sufficient to effect nucleation and precipitation of a crystalline microporous solid. The reactor employed in the process of this invention comprises any reactor which is inert with respect to hydrogen fluoride, such as a bomb or autoclave lined with tetrafluoroethylene fluorocarbon polymer. No special treatment or procedures are necessary to exclude air from the reactor, although special circumstances may arise wherein an inert atmosphere, such as nitrogen or argon, is desirable. Under normal circumstances agitation is not desirable, and therefore, the reactor contents are not stirred or agitated. Typically, the reactor is filled with the growth solution to not less than one-half capacity and preferably between one-half and three-quarters capacity. The purpose of filling the reactor to this level is to ensure that the organic solvent, hydrogen fluoride and structure-directing agent do not vaporize to a great extent during heating and also to ensure that the liquid pressure does not increase beyond safe limits.

The temperature and pressure in the reactor will vary depending upon the specific nutrients employed and microporous crystalline solid crystallized, but typically, the temperature ranges from about 50° C. to about 250° C. Preferably, the temperature of the reactor ranges from about 95° C. to about 250° C., more preferably, from about 150° C. to about 230° C. Below about 50° C., mineralization of the inorganic oxides may be too slow. Above about 250° C., the nutrients may crystallize in a dense phase which does not contain pores or channels. The pressure in the reactor will vary depending upon the vapor pressures of the organic solvent, the organic template or stabilizer, and hydrogen fluoride at the temperature of heating. Typically, the pressure in the reactor is autogenous at the heating temperature.

The above-identified heating process is conducted for a time sufficient to achieve the formation of a microporous crystalline solid. The crystallization time may be as short as 1 hour, but is more typically at least about 1 to 2 days. Times as long as 2 weeks or even 1 month are also possible.

When the heating procedure is finished, the reactor is cooled to room temperature. Cooling can be accomplished slowly as in exposing the hot reactor to ambient air or accomplished quickly as in quenching the hot reactor in cool water. Usually, the gelatinous product mixture is washed with acetone to remove the nitrogen-containing organic base at which time the gel falls apart. The mixture is then filtered to remove the organic liquids and amorphous small-particle silicas which pass through the filter. The product crystals are then washed with copious amounts of water and acetone and vacuum filtered.

The products of the process of this invention are microporous crystalline solids, suitable examples of which are noted hereinabove. The products possess crystalline structures which may be identified by powder X-ray diffraction (XRD) techniques, neutron diffraction methods, and more precisely, single crystal XRD. Infrared and Raman spectroscopic studies are useful for determining the presence of occluded organic species. 27Al and 29Si magic angle spinning nuclear magnetic spectroscopy (27Al- or 29Si-MAS-NMR) are useful for determining the presence of framework alumina and silica. Bulk elemental analyses are useful for identifying the overall stoichiometry of the elements. Other analytical methods, such as electron dispersive X-ray absorption spectroscopy (EDX) and 19F MAS-NMR, may be employed to determine the composition and structure of the microporous crystalline solids, if necessary.

The average size of the crystals grown in the process of this invention ranges from about 50 $\mu$m to about 3 mm in at least one of the three dimensions, as determined typically by transmission electron microscopy (TEM) and scanning electron microscopy (SEM). For large crystals prepared by this method a simple ruler can be used to measure crystal size. Preferably, the crystals are at least about 0.3 mm in size, more preferably, at least about 0.5 mm, even more preferably, at least about 1 mm, and most preferably between about 1 mm and 3 mm. In a preferred embodiment of this invention, crystals of the MOR, MFI, and MTN families of molecular sieves, including both pure silica and aluminosilicate MOR, MFI, and MTN species, having a crystal size of at least about 0.3 mm are produced. For the purposes of this invention the mordenite family includes ferrierite, dachiardite, epistilbite, and bikitaite; the MFI family comprises ZSM-5 (including silicalite) and ZSM-11; and the MTN family includes dodecasil structures. Significantly, the crystals of this invention can find uses in the field of high technology solid state optics and electronics.

ILLUSTRATIVE EMBODIMENTS

The following examples are illustrative of the process of this invention, but should not be construed to be limiting thereof.

Unless otherwise noted, the following reagents are used: silica (Cabot Cabosil ® EH-5); pseudo-boehmite alumina (Vista Catapal B ® or Dispal ®); tetrapropylammonium bromide (Aldrich); pyridine (A.C.S., BDH); pyridine solution containing 70 weight percent hydrogen fluoride (Aldrich); triethylamine solution containing 37 weight percent hydrogen fluoride (Aldrich). The equipment employed includes an oven (Fisher Scientific Isotemp Oven Model 630F) and a 45 mL acid digestion bomb (Parr) lined with Du Pont TEFLON ® tetrafluoroethylene fluorocarbon polymer.

The X-ray diffraction (XRD) powder patterns are collected using a Philips PW 1051 diffractometer emitting nickel-filtered Cu-Ka radiation (0.154178 nm, 40 kV, 15 MA). The sample is ground to a fine powder and then spread onto a glass slide for placement in the diffractometer.

Infrared spectroscopic measurements are made using a Nicolet 20SXB Fourier Transform IR spectrometer. Mid-infrared spectra over a range of 1400 $cm^{-1}$ to 400 $cm^{-1}$ are obtained by adding 50 interferograms. The samples are prepared by pressing the ground crystals into self-supporting wafers, diluted 1:40 with cesium iodide or potassium bromide, under a pressure of about 200 MPa.

Transmission electron micrographs (TEM) are taken using a Hitachi H-7000 transmission electron microscope with an accelerating voltage of 100 kV. Scanning electron micrographs (SEM) are obtained on a Hitachi S-570 scanning electron microscope using an accelerating voltage of 20 kV.

EXAMPLE 1

Ferrierite

A pure silica ferrierite is prepared as an example of the mordenite family of molecular sieves. Pyridine (0.30 mole; 23.7 g) and distilled water (0.16 mole; 2.9 ml) are mixed in a 250 ml TEFLON ® beaker. The beaker and a bottle containing a hydrogen fluoride/pyridine solution (70 percent HF) are placed in a glove bag, which is then flushed and filled with nitrogen. The bottle is opened, and 1.1 mL (0.039 mole HF) are removed with a TEFLON ® graduated cylinder or pipette and added to the TEFLON ® beaker. The beaker is removed from the glove bag, and silica (0.030 mole; 1.8 g) is gradually dissolved in the solution in the beaker yielding a viscous, transparent liquid. Propylamine (0.08 mole; 4.7 g) is added to the beaker. The $H_2O$/Si molar ratio is 5.3; the water to pyridine molar is 0.53. The contents of the beaker are loaded into the TEFLON ®-lined digestion bomb, which after filling is two-thirds full, and the bomb is sealed under air at atmospheric pressure and placed in the oven at 170° C. for 12 days. The pressure during heating is autogenous. At the end of the twelfth day the bomb is quenched in cold water and opened. The crystalline contents are washed with large quantities of acetone and water, vacuum filtered, and air-dried. The XRD pattern of the crystalline product is identified as that of ferrierite. Analysis of an electron micrograph of the crystals establishes that the average crystal size is 1 mm.

EXAMPLE 2

Silicalite

Silicalite is prepared as an example of the pentasil family of molecular sieves. Triethylamine (TEA; 0.24 mole; 25 g), distilled water (0.12 mole; 2.2 g) and propylamine (0.04 mole; 3.3 mL) are mixed in a 250 ml TEFLON ® beaker. The beaker and a bottle containing a hydrogen fluoride/triethylamine solution (37 percent HF) are placed in a glove bag, which is then flushed and filled with nitrogen. The bottle is opened, and 2.2 mL (0.04 mole HF) are removed with a TEFLON ® graduated cylinder or pipette and added to the beaker. The beaker is removed from the glove bag, and silica (0.04 mole; 2.4 g) is gradually dissolved in the solution in the beaker yielding a viscous, transparent liquid. Tetrapropylammonium bromide (0.0 mole; 2.6 g) is added to the beaker. The $H_2O$/Si molar ratio is 3.0; the $H_2O$/TEA molar ratio is 0.50. The contents of the beaker are loaded into the TEFLON ®-lined digestion bomb, which after filling is two-thirds full, and the bomb is sealed under air at atmospheric pressure and placed in the oven at 180° C. for 4 days. The pressure during heating is autogenous. At the end of the second day the bomb is quenched in cold water and opened. The crystalline contents are washed with large quantities of acetone and water, vacuum filtered, and air-dried.

The XRD pattern of the crystalline product is identified as that of silicalite. The infrared spectrum of the product shows peaks between 1050 $cm^{-1}$ and 1250 $cm^{-1}$ and between 400 $cm^{-1}$ and 500 $cm^{-1}$, which are identical to those observed in the spectrum of silicalite. An electron micrograph of the product shows crystals typical of silicalite with an average crystal size of 1 mm.

EXAMPLE 3

Dodecasil 3-T

Dodecasil 3-T is prepared as an example of the family of clathrasil crystalline microporous solids. Pyridine (0.30 mole; 23.7 g) and distilled water (0.16 mole; 2.9 mL) are mixed in a 250 ml TEFLON ® beaker. The beaker and a bottle containing a hydrogen fluoride/pyridine solution (70 percent HF) are placed in a glove bag, which is then flushed and filled with nitrogen. The bottle is opened, and 1.1 mL (0.04 mole HF) are removed with a TEFLON ® graduated cylinder or pipette and added to the beaker. The beaker is removed from the glove bag, and silica (0.03 moles; 1.8 g) is gradually dissolved in the solution in the beaker yielding a viscous, transparent liquid. The $H_2O$/Si molar ratio is 5.3; the water to pyridine molar ratio is about 0.53. The contents of the beaker are loaded into the TEFLON ®-lined digestion bomb, which after filling is two-thirds full, and the bomb is sealed under air at atmospheric pressure and placed in the oven at 180° C. for 7 days. The pressure during heating is autogenous. At the end of the heating period the bomb is quenched in cold water and opened. The crystalline contents are washed with large quantities of acetone and water, vacuum filtered, and air-dried.

The XRD pattern of the crystalline product is identified as that of dodecasil 3-T. The crystal is tetragonal (I42d) at room temperature. The infrared spectrum of the product also corresponds to the spectrum of dodecasil 3-T. Analysis of an electron micrograph of the product establishes truncated octahedral morphology similar to dodecasil-3C and an average crystal size of 1 mm.

EXAMPLE 4

Dodecasil 3-T

A TEFLON ®-lined autoclave is loaded with the following materials according to the procedure of the previous examples: N,N'-dimethylformamide (DMF;

0.34 mole, 25 g); silica (0.03 mole, 1.8 g); distilled water (0.16 mole, 2.9 g); propylamine (0.08 mole, 6.6 mL); 70 weight percent hydrogen fluoride/pyridine solution (0.04 mole HF, 1.1 mL); and tetrapropylammonium bromide (0.01 mole, 2.66 g). The $H_2O/Si$ molar ratio is 5.3; the $H_2O/DMF$ molar ratio is 0.47. The bomb is heated at 200° C. for 12 days, after which the bomb is cooled and opened to yield large crystals on the average 1 mm in size. The crystals are identified by XRD as dodecasil 3-T. When Example 3 is compared with Example 4, it is seen that large crystals of dodecasil 3-T can be grown in either a pyridine/HF medium or a medium wherein the pyridine is substantially replaced by N,N'-dimethylformamide.

EXAMPLE 5

Ferrierite

A TEFLON ®-lined autoclave is loaded with the following materials according to the procedure of the previous examples: diethylene glycol (0.24 mole, 25 g); silica (0.03 mole, 1.8 g); distilled water (0.16 mole, 2.9 g); propylamine (0.08 mole, 6.6 mL); 70 weight percent hydrogen fluoride/pyridine solution (0.04 mole HF, 1.1 mL); and tetrapropylammonium bromide (0.01 mole, 2.66 g). The $H_2O/Si$ molar ratio is 5.3; the water to combined moles of diethylene glycol and propylamine is 0.5. The bomb is heated at 200° C. for 21 days, after which the bomb is cooled and opened to yield crystals identified by XRD as ferrierite. The average crystal size is 500 μm (0.50 mm).

EXAMPLE 6

Al-Ferrierite

A TEFLON ®-lined autoclave is loaded with the following materials according to the procedure of the previous examples: pyridine (0.30 mole; 23.7 g), silica (0.03 mole; 1.7 g), alumina (2 mmoles; 0.2 g), water (0.16 mole; 2.9 mL), propylamine (0.08 mole; 6.6 mL), 70 weight percent hydrogen fluoride/pyridine solution (0.04 mole; 1.1 mL), and tetrapropylammonium bromide (0.01 mole; 2.6 g). The $H_2O/(Si+Al)$ molar ratio is 4.7; the water to pyridine molar ratio is 0.53. The autoclave is heated at 180° C. for 15 days, after which it is cooled and opened to yield crystals identified by XRD as an aluminosilicate ferrierite. The $SiO_2/Al_2O_3$ molar ratio of the ferrierite is 23, as determined by EDX on a single crystal. An electron micrograph of the crystals establishes an average crystal size of 350 μm (0.35 mm).

EXAMPLE 7

Al-Ferrierite

A TEFLON ®-lined autoclave is loaded with the following materials according to the procedure of Example 6: pyridine (0.30 mole; 23.7 g), silica (0.02 mole; 1.2 g), alumina (7 mmoles; 0.7 g), water (0.16 mole; 2.9 mL), propylamine (0.08 mole; 6.6 mL), 70 weight percent hydrogen fluoride/pyridine solution (0.04 mole; 1.1 mL), and tetrapropylammonium bromide (0.01 mole; 2.6 g). The $H_2O/(Si+Al)$ molar ratio is 4.7; the water to pyridine molar ratio is 0.53. The autoclave is heated at 180° C. for 15 days, after which it is cooled and opened to yield crystals identified by XRD as an aluminosilicate ferrierite. The $SiO_2/Al_2O_3$ molar ratio is 22, as determined by EDX on a single crystal. The average crystal size is 350 μm (0.35 mm), as determined by SEM.

EXAMPLE 8

Al-Ferrierite

A TEFLON ®-lined autoclave is loaded with the following materials according to the procedure of Example 6: pyridine (0.30 mole; 23.7 g), silica (0.025 mole; 1.5 g), alumina (3 mmoles; 0.3 g), water (0.16 mole; 2.9 mL), propylamine (0.08 mole; 6.6 mL), 70 weight percent hydrogen fluoride/pyridine solution (0.04 mole; 1.1 mL), and tetrapropylammonium bromide (0.01 mole; 2.6 g). The $H_2O/(Si+Al)$ molar ratio is 5.2; the water to pyridine molar ratio is 0.53. The autoclave is heated at 180° C. for 15 days, after which it is cooled and opened to yield crystals identified by XRD as an aluminosilicate ferrierite. The $SiO_2/Al_2O_3$ molar ratio is 44, as determined by EDX on a single crystal. The average crystal size is 350 μm (0.35 mm), as determined by SEM.

EXAMPLE 9

Dodecasil 3-T

A TEFLON ®-lined autoclave is loaded with the following materials according to the procedure of Example 3: pyridine (0.32 mole; 25.3 g), water (0.18 mole; 3.2 ml), 70 weight percent hydrogen fluoride/pyridine solution (0.046 mole; 1.31 ml), and silica (0.034 mole; 2.04 g). The $H_2O/Si$ molar ratio is 5.3; the water to pyridine molar ratio is 0.56. The autoclave is heated at 180° C. for 7 days, then quenched in water and opened to yield crystals identified by XRD as dodecasil 3-T and having an average crystal size of 3 mm, as determined by SEM.

What is claimed is:

1. A process of growing a crystalline microporous silica or aluminosilicate solid comprising preparing a mixture containing:
   (a) one or more nutrients capable of forming the crystalline microporous solid wherein the one or more nutrients are selected from the group consisting of a source of silica, a source of alumina, and a source of a charge balancing ion;
   (b) a growth medium comprising a nitrogen-containing organic base, hydrogen fluoride, and optionally, an organic solvent which does not inhibit the mineralization of the nutrients; the nutrients and growth medium being present in proportions sufficient to provide for the formation of the crystalline microporous solid; and
   (c) water in an amount such that the molar ratio of water to total framework-forming elements excluding oxygen is no greater than about 6, and such that the ratio of the moles of water to combined moles of nitrogen-containing organic base and optional organic solvent is no greater than 0.6, and heating the resulting mixture for a time sufficient to produce a crystalline microporous silica or aluminosilicate solid.

2. The process of claim 1 wherein the nutrient is a source of silica.

3. The process of claim 1 wherein the nutrients are sources of silica, alumina and a charge balancing cation.

4. The process of claim I wherein the nitrogen-containing organic base is pyridine, a ring-substituted pyridine wherein the substituent is a $C_{1-10}$ alkyl moiety; or a primary, secondary or tertiary $C_{1-10}$ alkylamine.

5. The process of claim 4 wherein the nitrogen-containing organic base is pyridine or triethylamine.

6. The process of claim 1 wherein the optional organic solvent is employed.

7. The process of claim 1 wherein the molar ratio of water to total framework-forming elements excluding oxygen is in the range from about 2 to about 5.

8. The process of claim 1 wherein the ratio of moles of water to combined moles of nitrogen-containing organic base and optional organic solvent is no greater than about 0.56.

9. The process of claim 1 wherein the temperature of heating is in the range from about 50° C. to about 250° C.

10. The process of claim 1 wherein a structure-directing agent is employed.

11. The process of claim 10 wherein the structure-directing agent is an alkylamine or tetraalkylammonium ion, wherein the alkyl group or groups contain from 1 to 20 carbon atoms.

12. The process of claim 11 wherein the structure-directing agent is propylamine or tetrapropylammonium.

13. The process of claim 1 wherein the molar ratio of fluoride to total framework forming elements excluding oxygen ranges from about 0.7 to about 2.0.

14. The process of claim 1 wherein the crystal size of the microporous crystalline solid is between about 0.3 mm and about 3 mm.

15. The process of claim 1 wherein the crystal size of the microporous crystalline solid is between about 1 mm and about 3 mm.

16. A process of growing a microporous crystalline silica wherein the crystal size is between about 0.3 mm and about 3 mm comprising preparing a mixture containing (a) a source of silica, (b) a growth medium comprising hydrogen fluoride, a nitrogen-containing organic base selected from the group consisting of pyridine, ring-substituted pyridines, and primary, secondary, and tertiary alkylamines, and optionally, an organic solvent other than the pyridines and alkylamines mentioned herein which does not hinder the mineralization of the source of silica and (c) water in an amount such that the water/silicon molar ratio is no greater than about 6 and such that the ratio of the moles of water to the combined moles of nitrogen-containing organic base and optional organic solvent is no greater than 0.6; and heating the resulting mixture for a time sufficient to produce a microporous crystalline silica having a crystal size between about 0.3 mm and about 3 mm.

17. The process of claim 16 wherein fumed silica is employed having a surface area in the range from about 100 $m^2/g$ to about 380 $m^2/g$ and a particle size in the range from about 7 $\mu m$ to about 100 $\mu m$.

18. A process of growing a crystalline aluminosilicate zeolite having a crystal size between about 0.3 mm and about 3 mm comprising preparing a mixture containing (a) a source of silica, a source of alumina, and a source of a charge balancing cation in amounts sufficient to form an aluminosilicate zeolite, (b) a growth medium comprising hydrogen fluoride, a nitrogen-containing organic base selected from the group consisting of pyridine, ring-substituted pyridines, and primary, secondary, and tertiary alkylamines, and optionally, an organic solvent other than the pyridines and alkylamines mentioned herein which does not hinder the mineralization of the source of silica, alumina, and charge balancing cation, and (c) water in an amount such that the ratio of moles of water to combined moles of silicon and aluminum is no greater than about 6 and such that the ratio of the moles of water to the combines moles of nitrogen-containing organic base and optional organic solvent is no greater than 0.6; and thereafter heating the resulting mixture for a time sufficient to produce a crystalline aluminosilicate zeolite having a crystal size between about 0.3 mm and about 3 mm.

19. The process of claim 18 wherein a fumed silica having a particle size in the range from about 7 82 m to about 100 $\mu m$ and a boehmite alumina having a particle size in the range from about 7 $\mu m$ to about 7000 $\mu m$ are employed.

20. The process of claim 18 wherein a structure-directing agent is employed.

21. A crystalline microporous solid having a crystal size between about 0.3 mm and about 3 mm, the solid being selected from the group consisting of the MOR, MFI, and MTN families of crystalline microporous solids.

22. The crystalline microporous solid of claim 21 wherein the crystal size is between about 1 mm and about 3 mm.

* * * * *